Jan. 14, 1930.  C. T. WEYMANN  1,743,990
APPARATUS FOR OPERATING VERTICALLY SLIDING WINDOWS
Filed April 18, 1927
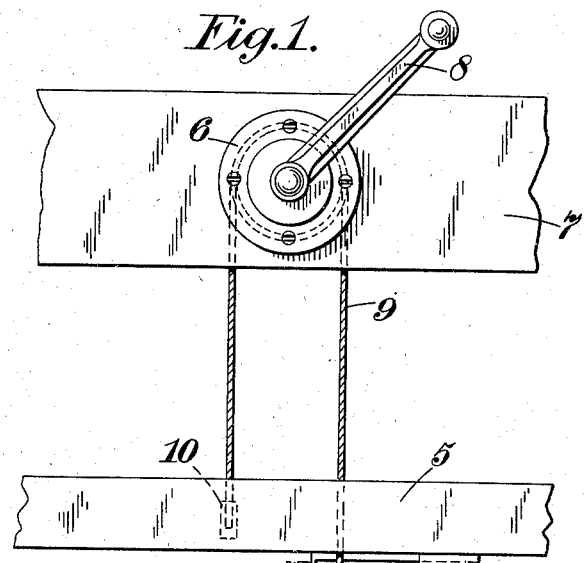
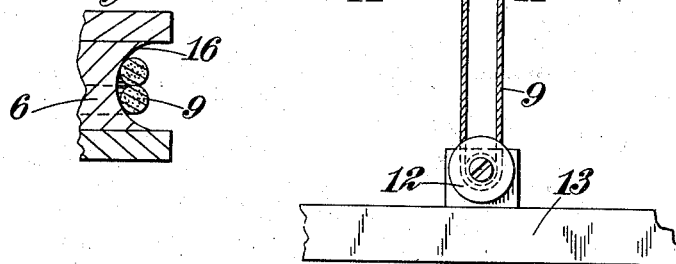
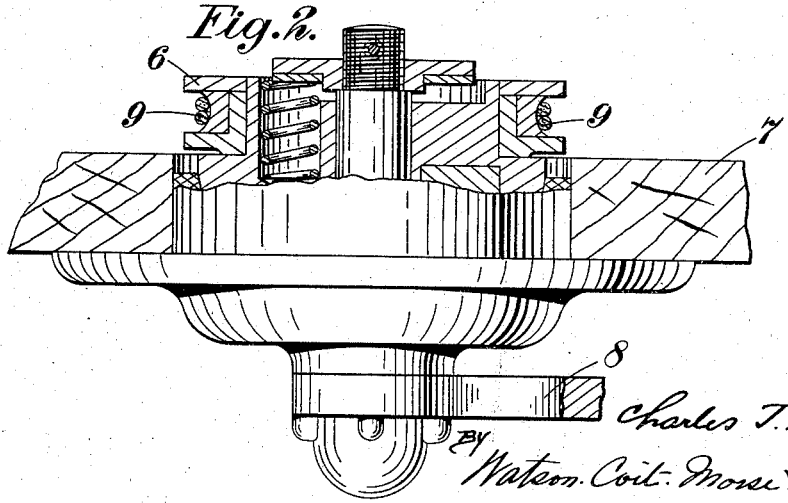
INVENTOR
Charles T. Weymann,
BY Watson, Coit, Morse & Grindle
ATTYS.

Patented Jan. 14, 1930

1,743,990

UNITED STATES PATENT OFFICE

CHARLES TERRES WEYMANN, OF PARIS, FRANCE, ASSIGNOR TO WEYMANN'S MOTOR BODIES (1925) LIMITED, OF LONDON, ENGLAND

APPARATUS FOR OPERATING VERTICALLY-SLIDING WINDOWS

Application filed April 18, 1927, Serial No. 184,732, and in Great Britain April 29, 1926.

This invention consists of improvements in or relating to apparatus for operating vertically sliding windows, particularly for automobile and like vehicles.

Chains passing over sprocket wheels are sometimes used to operate such windows, but the use of chains is undesirable particularly on account of the noise associated therewith. On the other hand cords and like flexible members can be used effectively only if the cord be wound more than one turn round the operating or driving pulley, but owing to the rotation of the latter there is a tendency for one turn of the cord to ride over another or others, and for the turns to overlap and thus interfere with the smooth and efficient operation of the sliding window. The object of this invention is to overcome these disadvantages.

The present invention relates to apparatus of the type comprising an operating pulley rotatable (e. g. by a handle) about a fixed axis, and a cord or like flexible member wound more than one turn round the pulley and operatively connected to the sliding window. According to the invention an apparatus of the above type is characterized in that the circumferential surface of the operating pulley is so shaped (e. g. like a capstan) that in cross-section the surface conforms to, or approximates to, a smooth concave curve. With this arrangement the turns of the cord on the pulley are constrained towards a mid-position in the width of the pulley and the tendency for the turns to overlap is thus obviated.

An example embodying the invention will now be described with reference to the accompanying drawings in which—

Figure 1 is a diagram showing the various parts in side elevation.

Figure 2 is a section of the driving pulley, and

Figure 3 is a section (on a larger scale than Figure 2) showing the curvature of the circumferential surface of the pulley.

Like reference numerals indicate like parts throughout the figures.

The invention is applied to mechanism for operating a vertically-sliding window whereof only the lower cross-bar 5 is shown in the drawings. An operating pulley 6 is mounted on a frame member 7 of the window well, and is rotatable about a horizontal axis by means of a handle 8. A flexible cord 9 is connected at opposite ends 10, 11, to the cross-bar 5, and between its ends the cord extends over the operating pulley 6 and from thence under a guide pulley 12 mounted on a fixed frame member 13 at the bottom of the window well. The end 11 of the cord is not attached directly to the cross-bar 5 but is connected to an arm 14 pivotally mounted on the underside of the cross-bar. A spring 15 in tension between the arm 14 and the cross-bar serves to keep the cord taut.

The cord 9 is passed one-and-a-half turns round the circumferential surface 16 of the pulley and in this way the necessary frictional grip is obtained between the cord and the pulley. On rotation of the pulley 6 the cross-bar 5 (and therefore the window carried thereon) will be raised or lowered depending upon the direction of rotation of the pulley. The turns of the cord on the pulley tend to be displaced laterally by rotation of the pulley but this tendency is counteracted by the curvature of the pulley's circumferential surface. As shown in Figure 3 the surface 16 is so shaped that in section it conforms to a smooth concave curve with the centre of the concavity disposed midway in the width of the pulley. Thus lateral movement of the turns on the pulley (due to rotation of the latter) is opposed by the rising sides of the surface 16 which constrain the turns towards a mid-position in the width of the pulley.

The cord 9 may be of silk, cotton or the like, or of wire (including stranded wire) or it may be a composite cord of wire and textile fibres.

The connection between the cord and the sliding window need not necessarily take the form illustrated in the drawings. The ends of the cord may for example be secured to the upper and lower frame members 7, 13, respectively while between its ends the cord passes over pulleys mounted on the cross-bar 5. An arrangement of this kind is described in British specification No. 215,301. The operating pulley provided by this invention may also be used in conjunction with an apparatus of the type illustrated in British specification No. 168,708.

Any desired locking mechanism (such as that described in British specification No. 215,301) may be used for holding the sliding window securely in any position to which it is adjusted.

I claim:

In window operating apparatus of the type specified the combination of two fixed frame pieces spaced apart one above the other, a window member vertically slidable between said frame pieces, an operating pulley mounted on one of the aforesaid frame pieces for rotation about a horizontal axis and having a circumferential surface which in cross-section conforms substantially to a smooth concave curve, a guiding pulley mounted on the other frame piece for rotation about a horizontal axis, and flexible cord wound more than one turn round the aforesaid circumferential surface of the pulley and having one end connected directly to the window member and the other end passed first round the guiding pulley aforesaid and then connected to the window member.

In testimony whereof I affix my signature.

CHARLES TERRES WEYMANN.